United States Patent Office

2,739,946
Patented Mar. 27, 1956

2,739,946

HYDROCARBON CONVERSION CATALYSTS

Walter R. F. Guyer, Roselle, Zigmond W. Wilchinsky, Westfield, and John P. Thorn, Elizabeth, N. J., assignors to Esso Research and Engineering Company, a corporation of Delaware No Drawing. Application November 1, 1952, Serial No. 318,318

11 Claims. (Cl. 252—466)

This invention relates to the preparation of catalysts for the treatment and conversion of hydrocarbons. More specifically, it relates to a new and improved method of preparation of a catalyst containing small amounts of a metal catalyst on a stable alumina support.

The catalytic metals with which this invention is concerned are the noble metals of group VIII of the Periodic System, which are known to be highly active for the hydrogenation and dehydrogenation of hydrocarbons. These catalysts also have a pronounced effect on splitting and rearranging the carbon-hydrogen and carbon-carbon bonds of hydrocarbon molecules at elevated temperatures. The specific noble metals with which the invention is particularly concerned include platinum, palladium, rhodium, iridium and the like.

These noble metal catalysts can be employed to particular advantage on a catalyst support in which alumina is the major constitutent, and the catalytic metal is present in very small amounts or even trace amounts. Thus, a variety of catalysts containing fractional percentages of platinum or palladium on an alumina-containing carrier have been found to be applicable to hydrocarbon conversion processes. They may be used to convert naphtha fractions of low motor fuel value to premium quality products having a high aromatic content, and improved volatility. Not only are high quality products obtained: an important advantage of these catalysts is that the particular combination of reactions which they promote with a naphtha feed stock is such that the original low octane quality feed constituents may be almost completely removed by a combination of isomerization, dehydrogenation and cyclization reactions.

These catalysts have been particularly useful in reactions of the general type known as hydroforming. This is an operation carried out in the presence of a solid catalyst and in an atmosphere containing free hydrogen, but without a net consumption of hydrogen. In hydroforming operations, there is ordinarily a net evolution of hydrogen due to the transformation of other hydrocarbons into aromatics. The group of hydrocarbons or aromatic precursors thus transformed includes substantially all of the $C_6$ ring naphthenes, a varying proportion of the $C_5$ ring naphthenes, and a proportion of the original paraffins which varies both with operating conditions and with the content of $C_6+$ hydrocarbon chains in the paraffin molecules present.

The platinum catalysts on an alumina base have been found to suffer from several well-known disadvantages. In the hydroforming of virgin naphtha feed stocks, for example, it is desirable to use these catalysts under relatively severe conditions of the order of 50 to 400 pounds p. s. i. g. since this results in a product of exceptionally high aromatic content and motor fuel quality. Unfortunately, the reactions which take place under these conditions, at relatively low hydrogen partial pressure, also result in the formation of an appreciable carbonaceous deposit which rapidly deactivates the catalyst. For this reason it has been common practice in commercial hydroforming operations with Pt-alumina catalysts to avoid the use of such low operating pressures, in spite of the high product quality which can be obtained by their use.

A particularly serious disadvantage of the supported noble metal catalysts, of which platinum on alumina may be taken as typical, is the fact that a coked catalyst of this type cannot ordinarily be regenerated readily with air over long periods of time without a definite loss in activity. This activity loss is so severe in many cases that it becomes completely impossible to produce a product of more than mediocre quality.

It is true that at higher operating pressures of the order of 400 to 1,000 p. s. i. g., the same catalysts may give a non-regenerative process in which the catalyst retains its activity over long periods of time without deactivation. However, the use of such high hydrogen pressures tends to increase the breakdown of the original molecular structure to lower molecular weight saturated materials, by a combination of various cracking, dealkylation, and re-hydrogenation reactions known collectively as hydrocracking. Hydrocracking under these high pressure hydroforming conditions can be minimized, but only to a limited extent, by variations in the composition of the catalyst.

The development of platinum catalysts suitable for air regeneration is thus an important problem, and the lack of such catalysts has been a serious obstacle in the way of low pressure platinum catalyst reforming.

A careful study of the characteristics of highly active and deactivated catalysts of this general type has indicated that the structure of the platinum has a definite relationship to activity. Apparently, the ability of these catalysts to stand repeated regeneration as required for low pressure hydroforming operations can be correlated to a considerable extent with the fineness or crystallite size of the platinum dispersion.

Catalysts of low initial activity and catalysts whose activity has become spent upon repeated regeneration are both found to have the platinum in the form of relatively large crystals. For a given platinum content, this may mean that there are fewer active platinum centers exposed, less platinum surface exposed for catalytic action, possibly less intimate contact between the platinum and the catalyst support, and correspondingly more catalyst surface where the base is relatively remote from a platinum center of activity.

With the usual platinum-on-alumina base catalysts, therefore, the necessity of operating at minimum carbon levels places a limit on either the operating severity and product quality or on catalyst life, since operating at a severity sufficient to give high octane quality results in high coke formation and an increased rate of catalyst deactivation. Various methods have been proposed to minimize this tendency, including changes in the method of platinum impregnation and activation of the platinum-on-alumina catalyst. Experience has shown, however, that the high initial activity which can be realized by having a very fine initial degree of metal dispersion is not at all necessarily linked with high stability. High stability toward repeated air regeneration does appear to be linked with high thermal stability, and this is a property determined by the character of the alumina base itself as well as by the type and fineness of the platinum dispersion.

Without limiting the present invention to any theories of operation, it is apparent that a good platinum or other noble metal catalyst for use under high severity conditions where air regeneration is required must combine the necessary initial activity with high thermal stability.

An object of the present invention is to prepare a noble metal catalyst for the hydroforming of naphthas suitable for use under coking conditions to obtain a product of improved octane quality.

Another object is to prepare a noble metal catalyst of improved regeneration characteristics.

Still another object is to prepare such a catalyst in which the noble metal is stabilized for repeated regenerations by being finely dispersed throughout an alumina base of greatly improved thermal stability.

Another object is to prepare such a catalyst by a specific process in which the alumina carrier base is brought down from a true solution of an aluminum alcoholate in an organic solvent containing also a platinum compound in homogeneous dispersion, which is subsequently converted to metallic platinum. The gelation of the alumina from such a solution is brought about by the gradual addition of controlled amounts of water, and the solution before this hydrolysis may contain a suitable organic peptizing agent or other reagents to modify the nature of the alumina and the platinum deposit obtained.

According to the present invention, catalysts of improved activity and selectivity and marked superior stability to air regeneration may be obtained by simultaneously gelling the alumina and co-precipitating a platinum compound from a suitable non-aqueous solution, by the addition of controlled amounts of moisture. The platinum compound in this method of preparation may be homogeneously dispersed in the solution either in the form of a solution or as a platinum-containing sol.

In either case, it is included in the final catalyst in the finest state of dispersion. The ability of the catalysts thus prepared to maintain a very fine state of Pt dispersion even after exposure to high temperature oxidation conditions is directly related to the stability of these catalysts toward air regeneration. The initial dispersion obtained by including a platinum compound into the hydrous alumina precipitated in this form of operation is fixed in active and finely dispersed form. This degree of dispersion is retained upon reducing the platinum compound to metallic form, and upon activation and development of the fine alumina structure by calcination of the initial platinum-containing alumina gel.

Catalysts prepared according to this invention may be made by dissolving chloroplatinic acid or other suitable platinum salt in an organic medium such as glacial acetic acid, combining this with a solution of an aluminum alcoholate in alcohol which may have added hydrocarbon as a diluent, and evaporating the solvent from the combined solution in the presence of moist air. In this method of preparation no precipitant for the platinum is employed, and moisture for the hydrolysis for the alcoholate is added at a controlled slow rate by absorption from the atmosphere. Other methods of introducing water at a controlled rate may be employed, the important element being the combination of the aluminum and platinum compounds in true solution prior to the gelation step.

In another modification of the invention the solution of aluminum and platinum compounds prepared as above may be treated before gelation with a precipitant such as hydrogen sulfide, ammonium sulfide, etc. which is capable of producing a very finely divided colloidal dispersion of a platinum compound throughout the aluminum-containing solution. In this modification it is particularly important that the platinum be in the most finely divided form at all times before the alumina is brought down in gel form, so that the platinum in the resulting catalyst is likewise most finely divided.

After the platinum-containing gel is formed at room temperature, the material is dried thoroughly at a relatively low temperature, in the range of 100° to 300° F. to remove remaining traces of the organic solvent before the platinum is reduced to the metallic form. This solvent evaporation may be expedited by using a stream of a stripping gas such as steam. Following this low temperature drying, the catalyst may be dried further at gradually increasing temperature levels or in successive stages at about 500 to 1100° F. in the usual manner, and reduced with hydrogen before use. This drying step following complete solvent removal may also be carried out in a hydrogen atmosphere if desired. It is important to avoid catalyst reduction prior to complete removal of the organic solvent, although good catalysts can be prepared by a method in which solvent removal and platinum reduction take place simultaneously.

The platinum to be added in this method of preparation may be combined with a peptizing agent such as acetic acid or other organic acid, which serves both as an aid in obtaining uniform dispersion of platinum in the alumina and to prepare a carrier base of improved surface properties.

The usual form in which platinum is employed in the preparation of platinum-containing compositions is chloroplatinic acid, available commercially as the hydrated salt $H_2PtCl_6 \cdot H_2O$ (40% Pt metal). The salt may be dehydrated, but either the anhydrous form or the ordinary hexahydrate is hygroscopic. The use of glacial acetic acid as a solubilizing agent makes it possible to use the hydrated platinum salt directly in the catalyst preparation. The amount of water which is present in such a composition corresponds to about 2% $H_2O$ based on alumina when a 5% Pt-on-alumina catalyst is being prepared. This amount of water may be solubilized by including 5% of glacial acetic acid, based on alumina. The concentration of aluminum alcoholate in the organic solution employed in making up these catalysts is commonly of the order of 100 grams of alumina equivalent per liter of solution. Amounts of water up to 10% based on the alumina may be tolerated by the use of acetic acid as the solubilizing agent, before the composition becomes non-homogeneous due to a phase separation. It will thus be seen that the amounts of water concerned are fractional percentages based on the total solution.

It is also possible to dissolve the chloroplatinic acid directly in the anhydrous alcoholate when an alcoholic solution of an aluminum alkoxide is used as the source of alumina. However, a small amount of acetic acid is desirable in any case to peptize the alumina formed on subsequent hydrolysis, and there is a commercial advantage in being able to employ the commercially available chloroplatinic acid without special efforts to avoid the small amount of moisture ordinarily associated with it. Larger amounts of acetic acid may also be employed if desired.

The best results in terms of the properties of the finished catalyst are obtained when the amount of acetc acid employed is from about 2% to 200% by weight based on the alumina, with amounts from 2% to about 60% by weight being preferred. Larger amounts of acetic acid than this are found to have a definitely harmful effect in terms of the degree of fineness of the platinum dispersion obtained in a finished catalyst using the alumina thus prepared. The 60 weight percent of acetic acid corresponds approximately to one-half of a mol equivalent per mol of alumina, and 200 weight percent corresponds to about 3 mols of acetic acid per mol of alumina or one-half of the theoretical amount to form aluminum acetate.

The method of evaporating the solvent in moist air is found to be a convenient means of combining solvent removal and hydrolysis. However, it is equally possible to introduce moisture in controlled amounts by adding moist alcohol, by introducing steam or boiling water at a temperature sufficiently high as to prevent any local accumulation of water, or in any other suitable manner. The important feature of the hydrolysis is simply that moisture must be provided in such a way that the hydrolysis occurs in the presence of the platinum compound, with a low local concentration of water.

This particular method of preparation combines the desired type of fine platinum dispersion with a particular type of alumina which exhibits unusually high thermal stability. The hydrolysis of the aluminum alcoholate with a low local concentration of water at the point of hydrolysis apparently forms an entirely different type of hydrous alumina known as "boehmite," a monohydrate or alpha hydrate of alumina. The ordinary method of hydrolyzing the aluminum alcoholate by combining it directly with water, at high local concentrations, produces instead the form of hydrous alumina known as "bayerite," which is a tri-hydrate or beta hydrate of alumina. The various methods of hydrolysis outlined above provide a low local concentration of water and have been found to give "boehmite" rather than "bayerite."

The desired high thermal stability of platinum-alumina base catalysts depends both upon the type of alumina employed and upon the method by which the platinum is combined with it. Catalysts on an alumina derived from boehmite may show exceptional thermal stability, as will be shown in further detail below, but this is obtained only when the platinum is included in the composition before the alcoholate is hydrolyzed. Impregnated catalysts prepared by the ordinary procedure in which the alumina is first precipitated and then impregnated with the platinum solution, either before or after further drying, do not exhibit the same high thermal stability of the finished catalyst.

The method of the present invention is particularly suited for the preparation of catalysts containing small amounts of platinum, of the order of from about 0.05 to 2% by weight of metallic platinum in the finished catalyst. While catalysts of the lowest platinum concentration have very desirable activity-selectivity relationships, catalyst activity is improved markedly with increasing platinum concentrations up to about 0.3% platinum. A continued improvement in activity with no loss in selectivity is observed up to about 2% Pt concentration, but the gain above 1% platinum is not as great. Accordingly, concentrations in the range of about 0.3% to 1% Pt in the finished catalyst are preferred.

Catalysts of this Pt concentration can be prepared by including the requisite amounts of platinum salt in the whole amount of the alumina required to give a finished catalyst having the desired concentration of catalytic metal. It is also possible, however, to prepare active catalysts of the same platinum concentration by an intermediate concentrate technique in which a small amount of a platinum-alumina composition of higher metal concentration is mixed with or precipitated on the surface of a larger amount of alumina carrier base. The alumina carrier in this type of procedure may be separately prepared. A 0.6% Pt-on-alumina catalyst can be made up according to this procedure, for example, by mixing ten parts of a platinum concentrate comprising 6% Pt-on-alumina with 90 parts of the alumina base. This procedure has been described in more detail in our co-pending application S. N. 263,694, now abandoned entitled "Platinum Hydroforming Catalysts."

The present method of operation can also be employed conveniently to incorporate certain stabilizing components such as silica, titania, zirconia, thoria and the like. These materials may be added to the composition in various manners. They may be introduced into the anhydrous platinum-aluminum compound solution, for example, either as a very finely divided colloidal dispersion in a non-aqueous solvent, as a true solution of a soluble compound convertible to the stabilizing oxide on hydrolysis, or even, in certain cases, as an aqueous solution or dispersion using a very small amount of water no more than a fractional percentage on the total alcohol solution.

The use of the soluble chlorides or oxychlorides of the catalytic components may be found a particularly convenient means of introducing them into the catalyst preparation in small amounts, free of harmful contaminating elements. A further advantage in the use of these materials, including the platinum, in the form of a chloride-containing compound may reside in the beneficial effect of small amounts of residual halogen in promoting the activity of platinum-on-alumina or related noble metal catalysts of this general type. It will be understood, of course, that the nitrates, sulfates or other soluble salts of these components may be preferred and that the use of any suitable soluble salt comes within the purview of this invention.

In other cases it may be desirable to add certain acidic or basic promoters such as HF, $P_2O_5$, $B_2O_3$, ZnO, MgO, CaO and the like for the purpose of modifying the activity or selectivity of the resultant catalyst. These materials in concentrations of from about 0.1% to 5 wt. percent may be introduced during the initial preparation of the alumina-platinum composite, as as a special step in the finishing process. Alternatively, using the intermediate concentrate procedure disclosed in S. N. 263,694, these promoters may be added either to the platinum-rich concentrate or to the diluent alumina fractions of the catalyst.

Several examples of the preparation and use of catalysts according to this procedure will now be given to illustrate applicants' invention.

EXAMPLE I

A catalyst containing 0.5 wt. percent Pt on an especially pure alumina base is prepared according to the present invention by dissolving 8.1 grams of 40% chloroplatinic acid in 243 cc. of glacial acetic acid and mixing this solution with 10 liters of an aluminum amylate solution containing 65 grams/liter of equivalent $Al_2O_3$. A clean amber solution is obtained, with no precipitate. The solution is then permitted to hydrolyze by contact with ambient air which may have a moisture content of about 0.5–5 percent by volume, for 16 hours. At the end of this time the solvent has evaporated, and the material has the appearance of a sandy, translucent gel. The platinum-alumina composite is then pilled, placed in an $H_2$ atmosphere, and stripped in a stream of hydrogen at about 100 v./v./hr. while reducing gradually over a period of 8 hours, raising the temperature slowly from room temperature to 900° F. The finished catalyst thus prepared will be referred to as catalyst (A).

Two conventional Pt-alumina catalysts (B) and (C) used for purposes of comparison, consist of impregnated commercial aluminas having the same platinum content as catalyst (A). Catalyst (B) is supported on a commercial grade of pure activated alumina, and the support for catalyst (C) is an activated alumina containing about 2.5% of silica. The dry alumina base in both these catalysts is impregnated with an aqueous solution of chloroplatinic acid sufficient to yield 0.5% platinum by weight in the finished material. The catalysts are then dried and reduced in a stream of hydrogen at gradually increasing temperatures, as above.

EXAMPLE II

Evidence of the very greatly improved stability of the new catalysts towards high temperature oxidizing conditions is obtained in two convenient accelerated tests which measure the change in actual hydroforming activity and the related change in X-ray crystal size of the platinum particles in an aged sample of catalyst, after a prolonged exposure to high temperatures in which the catalyst is heated at 1250° F. for 64 hours in air. These tests show that catalysts having the smallest platinum crystallite size correspond uniformly with those having the highest activity. Platinum crystallite size during this heat aging period approaches an equilibrium value, with relatively little further change on further heating. Pilot plant tests show that this corresponds to the crystallite size which is approached as an equilibrium value in low pressure hydroforming tests involving periodic air regeneration over a much longer period of time, which varies from days to weeks or months depending upon catalyst stability. The ability of a given catalyst to withstand this aging treatment without marked increase in crystal size is thus an excellent indication of good high temperature stability.

According to this method of test, the impregnated platinum-on-alumina base catalysts which show a marginal stability towards oxidative regeneration have a crystallite size of about 210–250 Angstroms. Fresh catalysts of the highest activity may show a crystallite size of about 30–50 Angstroms on X-ray examination before aging. The extent to which this size increases during the heat aging test is a direct measurement of thermal stability, and high thermal stability is a prime requisite in catalysts which are to be regenerated by burning in air.

The X-ray measurement of platinum concentration and crystallite size is based on a spectrometer trace of the diffraction pattern. The line chosen for the study of these catalysts corresponds to the Miller indices $(h\ k\ l)$ of (311), representing the reflection from the set of planes in the crystal lattice having the interplanar distance $d = 1.18$ A. The lines of lower Miller index are obscured by the pattern of the alumina support. The crystal size is determined from the breadth of the diffraction lines, according to standard procedures, correcting for line broadening. The diffraction patterns used in the present study have been obtained with a Norelco Geiger counter X-ray spectrometer.

The effect of the heat aging tests on catalysts A, B and C is summarized in the following Table I. The hydroforming results shown are those obtained with a 50 octane number 200–330° F. Coastal virgin naphtha, at a pressure of 200 p. s. i. g., 900° F., for 6 hours on stream at a weight hourly space velocity of one, with a hydrogen to hydrocarbon ratio of 6:1. Following this run the catalyst is regenerated to remove carbon by burning with diluted air followed by straight air. It is then subjected to accelerated heat aging by heating for 64 hours at 1250° F. in air, and sampled for X-ray examination, after which the reforming test is repeated.

TABLE I

| Catalyst Description | (A) Slow Hydrolysis | | (B) Impregnated Alumina | | (C) Impregnated Alumina-SiO$_2$ | |
|---|---|---|---|---|---|---|
| | Fresh | Aged | Fresh | Aged | Fresh | Aged |
| C$_5$+ Gasoline: | | | | | | |
| Research Clear Octane No. | 93.1 | 88.5 | 88.7 | 55.0 | 91.0 | 61.0 |
| Δ Octane No. Loss | 4.6 | | 33.7 | | 30.0 | |
| Pt Crystallite size after aging, A. | 98 | | 210 | | 215 | |

The catalyst (A) prepared by slow hydrolysis of the platinum-containing aluminum alcoholate declined in activity by only about 5 octane units after aging, compared to 30 to 34 octanes for catalysts (B) and (C) prepared by the usual method of impregnation. The activity of the conventional catalysts was, in fact, almost completely destroyed, while that of catalyst (A) was only slightly impaired by the same drastic treatment. In line with this, the platinum crystallite size in catalyst (A) after heat aging shows only a moderate increase, which is very much less than that observed in these or other conventional catalysts of the usual poor thermal stability. It is apparent that a large improvement in activity maintenance and catalyst stability has been achieved, which is of considerable commercial significance.

EXAMPLE III

Another type of catalyst consisting of 0.5 wt. percent Pt on pure active alumina is prepared by first making up a concentrate of 5% Pt on alumina following the same procedure as that used for catalyst (A) except for the amount of chloroplatinic acid employed. This material after hydrogen reduction is mixed ten parts with 90 parts of a calcined active alumina derived from the same aluminum alcoholate solution by bulk hydrolysis with water. The fresh catalyst prepared by this intermediate concentrate technique shows a Pt crystallite size of 80 A., and the same size after heat aging. This corresponds to an unusually high thermal stability, in spite of the fact that 90% of the alumina present is not of the slow hydrolysis type. The octane rating of the hydroformed naphtha obtained using this catalyst shows a drop of less than 4 units before and after heat aging, from 88.7 to 85.0 clear Research, confirming this high stability.

EXAMPLE IV

In another method for evaluating the activity maintenance of catalysts, the preparations are charged to testing units in which a series of 4-hour hydroforming runs is made using the same 200–300° F. Coastal virgin naphtha at 200 p. s. i. g., 900° F., 1 w./hr./w. and 6:1 hydrogen to hydrocarbon mole ratio. Following the on-stream period the catalyst is regenerated by burning with diluted air followed by straight air, for a total of about 4 hours, and the cycle repeated.

A catalyst comprising 0.6% Pt on pure alumina for testing by this procedure is prepared by dissolving 7.5 grams of 40% chloroplatinic acid in 190 cc. of glacial acetic acid and mixing with 7.7 liters of aluminum amylate containing 65 grams of equivalent Al$_2$O$_3$ per liter. This homogeneous solution is permitted to hydrolyze slowly over a period of 16 hours in contact with ambient air having a relative humidity of 35–40% at 70° F., or a moisture content of about 1% by volume. After the solvent is evaporated, the catalyst is pilled and reduced slowly in a stream of hydrogen.

On testing for activity maintenance as described above, this catalyst shows a drop in activity only 0.9 octane units over a period of 21 air regenerative cycles. This represents approximately 168 hours on heat. By comparison, the conventional catalyst (B) of Example I above, prepared by the impregnation of a commercial activated alumina, shows a decline of 19.8 octane units in 21 cycles in a parallel test.

The catalyst in this case thus shows a marked improvement in activity maintenance over a conventional impregnated catalyst. In line with this, a corresponding improvement in thermal stability is indicated by its Pt crystallite size of 150 A. after heat aging, which is substantially better than that of catalyst (B). The difference indicated in thermal stability between this catalyst and catalyst (A) may be attributed to minor differences in the method of final drying and stripping employed.

EXAMPLE V

The effect of careful preliminary solvent removal on thermal stability is also shown in a series of catalyst preparations using a 5% Pt concentration similar to that used as the first step in Example III. The three catalyst preparations in this series, using 37 wt. percent of acetic acid, based on alumina in each case, differ in the addition of extraneous water to the alcoholate solution before hydrolysis, to the extent of 0, 2 and 10% of the theoretical amount for complete hydrolysis of the alcoholate to Al(OH)$_3$. Satisfactory catalysts are obtained in each case, although the 10% H$_2$O case is limiting due to the incipient tendency of the solution to separate out into two phases.

Portions of these three preparations, after hydrolysis as above by evaporating the solvent in an atmosphere of moist air, show the following results (Table II) with different methods of final drying before reduction.

Table II
EFFECT OF FINAL DRYING BEFORE REDUCTION

| Water content, Percent of Theoretical | Crystal Size of Reduced and Heat Aged Catalyst ||
|---|---|---|
| | Dried at Room Temp. | Dried at 250° F. |
| 0 | 72 | 100 |
| 2 | 79 | 102 |
| 10 | 74 | 92 |

Drying at room temperature gives definitely superior results to a drying without stripping at a temperature of 250° F., which is high enough to cause the dehydration of traces of alcohol present, resulting in the resinification of residual solvent on the catalyst surface as soon as a portion of the platinum becomes reduced to the active metallic state.

EXAMPLE VI

The effect of acetic acid concentration during the gelation on the ultimate crystallite stability of the co-precipitated platinum is shown in a series of tests using 0.5% and 5% Pt concentrations. Samples A—G in the series shown in Table III are aliquot portions of a solution of 0.88 grams of chloroplatinic acid (40% Pt) dissolved in 26.6 cc. of glacial acetic acid, split into seven equal parts and combined in homogeneous solution with 146 cc. of aluminum amylate in each case after adding various further amounts of acetic acid. These preparations correspond to 0.5% Pt on alumina. Samples H—J represent 1.25 grams of chloroplatinic acid (0.5 gram Pt.) added to 146 cc. of the same amylate solution, after dissolving the platinum salt in 50 cc. of amyl alcohol, 7.6 cc. and 73 cc. of glacial acetic acid, respectively, in these three preparations. This represents 5% Pt-on-alumina. The catalysts in this series were all finished by drying in ambient air, at room temperature, followed by stripping and reduction in a stream of hydrogen starting at room temperature.

The results for Pt crystal size after heat aging, shown in Table III, indicate a definite effect of acetic acid concentration on thermal stability of the finished catalyst. The use of acetic acid is desirable, with about 35 wt. percent on alumina giving the best results. Either no acid or amounts above about 200 wt. percent are found to give a definitely less stable catalyst.

Table III
EFFECT OF ACETIC ACID CONCENTRATION

| Catalyst Sample | Acetic Acid, Wt. Percent on Alumina | Pt Crystallite Size, A. After Heat Aging |
|---|---|---|
| 0.5% Pt: | | |
| A | 37 | 48 |
| B | 75 | 65 |
| C | 150 | 60 |
| D | 225 | 105 |
| E | 300 | 100 |
| F | 375 | 150 |
| G | 560 | 230 |
| 5% Pt: | | |
| H | 0 | 105 |
| I | 80 | 74 |
| J | 770 | 195 |

EXAMPLE VII

The present technique of preparing a Pt catalyst on a pure catalyst support can also be applied to the preparation of promoted catalysts such as Pt-on-alumina plus silica. As one example of such catalysts, the intermediate concentrate technique may be used to prepare an 0.6% Pt—0.2% $SiO_2$—99.2% alumina catalyst by dissolving 15.0 grams of chloroplatinic acid (equivalent to 6 grams Pt metal) in 35 grams of anhydrous glacial acetic acid, and adding slowly to 1 liter of aluminum amylate solution containing the equivalent of 100 grams of aluminum oxide plus 14.9 grams of ethyl silicate. This solution is permitted to hydrolyze slowly while evaporating the solvent by exposure to moist air. The dry catalyst is then placed in a hydrogen atmosphere at room temperature, stripped and reduced in a rapid stream of hydrogen at gradually increased temperature. After purging, it is treated with air for 4 hours at 1100° F., and then pulverized. The pulverized catalyst is then suspended in an alumina hydrosol prepared in the following manner: 9 liters of the above-mentioned aluminum amylate solution, in which the solvent is a mixture of amyl alcohol and a heavy naphtha fraction, are added to 9 liters of distilled water containing 35 grams of glacial acetic acid. After hydrolysis, the immiscible solvent layer is decanted and the last traces of solvent removed by steam stripping, during which operation the hydrosol is formed. The mixture of platinum concentrate plus hydrosol is homogenized and spray dried or otherwise dried to yield a platinum catalyst of high activity and stability, which may be prepared directly by this means in a size range suitable for use in a fluid solids type of operation.

EXAMPLE VIII

Another catalyst of the same nominal composition as in Example VII is made without the use of the hydrosol, by dissolving the ethyl silicate and chloroplatinic acid plus acetic acid in 10 liters of the aluminum amylate solution. The entire solution is then slowly hydrolyzed and coprecipitated by permitting the solvent to evaporate in an atmosphere of moist air. After reduction and stripping in hydrogen the catalyst is heated in air at 1100° F. for 4 hours as before, and pilled for use.

EXAMPLE IX

The intermediate concentrate technique as applied in Example VII can also be modified in a number of ways to prepare catalysts of the same nominal composition. In another such preparation, a concentrate of platinum-silica and alumina is prepared by adding 12.1 grams of silicon tetrachloride carefully to 1 liter of the alcoholate solution, and then adding thereto 15 grams of chloroplatinic acid dissolved in 35 grams of glacial acetic acid. This forms a homogeneous solution which is permitted to hydrolyze and evaporate slowly; and after reduction with hydrogen is treated with air for four hours at 1100° F. The concentrate is pulverized, thoroughly mixed with 900 grams of a pure alumina diluent, pilled, and used for hydroforming. The diluent in this catalyst is a precipitated pure alumina prepared by adding a solution of 4,250 grams of aluminum chloride hexahydrate plus 20 liters of distilled water to 30 liters of water containing ammonium hydroxide, maintaining a pH of about 7 to 9 during the precipitation. The alumina is filtered, reslurried with water and re-filtered to a total of four times, then dried and activated for four hours at 1100° F. for use as above in the catalyst preparation.

Similar catalysts using more or less silica can also be prepared by these methods, in the range of 0.5 to 10% based on the coprecipitated alumina. In addition, other oxides may be introduced by the same methods, as mentioned previously.

EXAMPLE X

A modified type of Pt dispersion in a catalyst having the same composition and initial preparative steps as catalyst (A) in Example I above is made up by carefully sulfiding the initial clear solution of chloroplatinic acid, acetic acid and aluminum alcoholate, before hydrolysis. This sulfiding is conveniently accomplished by diluting 2 cc. of saturated alcoholic ammonium sulfide to 50 cc. in amyl alcohol, for convenience in handling, and adding this slowly with thorough mixing to the 10 liters of amylate solution. This gives a colloidal sol of extremely finely divided platinum sulfide particles homogeneously dispersed throughout the solution. The solution is hydrolyzed as before, after which the solvent-freed material is stripped and reduced. The reduction of this catalyst is also ordinarily carried out in a stream of hydrogen, although good catalysts may be obtained by reducing the platinum sulfide to metallic platinum by roasting in air.

The alcoholate solution employed in the preparation of these catalysts is ordinarily a solution of mixed aluminum amylates or aluminum butylates in the corresponding mixed amyl alcohols or butyl alcohols. Lower or higher alcohols may be used in this preparation if desired. However, the lower alcohols are water soluble, which makes the ultimate recovery of the alcohol from the solvent vapor stream or liquid layer more difficult. This recovery may be simplified by the addition of a hydrocarbon diluent to the alcohol solution, and a 1:1 dilution of mixed amyl alcohols with a virgin heavy naphtha is the solvent used in most of the above examples. Still higher boiling alcohols may also be used to advantage, providing the aluminum alcoholate produced is completely soluble in the alcohol used so that a homogeneous solution with the platinum salt can be prepared prior to the hydrolysis and precipitation of the hydrous alumina. This solubility is enhanced by the use of mixed alcohols and such a mixed solvent is preferred, regardless of whether the particular alcohols used are mixed butanols, pentanols, or their higher molecular weight homologues.

It should be recognized that the character of the hydrous alumina formed by the hydrolysis of the alcoholate solution in the presence of the platinum salt and glacial acetic acid is not necessarily the same as that which is formed from the alcoholate alone under the same conditions for controlled hydrolysis. The presence of the platinum salt in the mixed solution prior to the hydrolysis is the essential feature of the present invention, which relates to the whole method of preparing the catalyst as distinguished from the preparation of the alumina base itself.

While the above description has been directed primarily to the preparation of Pt catalysts, it will also be recognized that similar techniques may be used to advantage in the preparation of other catalysts on a thermally stable alumina or alumina-containing base. The application of this invention is particularly advantageous in cases where a very small amount of the catalytic component is to be finely divided and uniformly dispersed throughout the carrier. Such catalysts are recognized where the catalytic component is one of a variety of other precious metals, including palladium, ruthenium, iridium, silver, gold and others. The technique can also be applied to advantage with metals such as iron, nickel or cobalt, or in general with other catalytic components which can be co-precipitated from a non-aqueous solvent together with alumina formed by the slow hydrolysis of an aluminum alcoholate in homogeneous solution with the other component desired.

Catalysts prepared according to the present invention may be applied to reforming broad fractions within the naphtha boiling range for the preparation of fuels such as gasoline, or to narrow boiling fractions for the preparation of specific compounds such as benzene or toluene. The naphtha feed stock to be treated by the reforming process can be derived from a wide variety of sources, including straight run or virgin naphtha and various secondary products derived from petroleum or other hydrocarbon feed stocks. It may be understood to include both light naphthas and heavy naphthas within the boiling range from about 0° to 450° F.

Catalysts prepared according to the present invention may be made into the form of powder, microspheres, granules, pellets or larger spherical particles depending upon whether the hydrocarbon treatment for which they are to be employed is carried out by the fluid solids technique or by a moving bed or fixed bed process.

While the above description has directed attention primarily towards the use of these catalysts in hydroforming, they may be also employed to advantage in a variety of hydrocarbon conversion processes involving hydrogen transfer or the presence of molecular hydrogen as a reactant or product gas. This includes catalytic aromatization, hydrofining and hydrocracking, as well as cyclization, hydrogenation, dehydrogenation and hydroforming.

What is claimed is:

1. The method of preparing a platinum on alumina catalyst for the conversion and treatment of hydrocarbons which comprises adding to a solution of mixed aluminum amylates, in a solvent containing a mixture of amyl alcohols, a minor amount of a solution of chloroplatinic acid in from about 2% to 60% by weight of glacial acetic acid based on the alumina equivalent present, evaporating the solvent from the clear homogeneous solution thus formed while simultaneously hydrolyzing the aluminum amylate by exposure to an atmosphere of moist air, precipitating thereby a pure hydrous peptized alumina and simultaneously coprecipitating therewith the platinum compound present, further drying the deposit thus obtained by placing it in a hydrogen atmosphere and stripping at room temperature in a rapid stream of hydrogen to remove the remaining solvent and uncombined water, subsequently reducing said deposit to form metallic platinum by heating gradually in said hydrogen atmosphere to a temperature from about 900° to 1000° F., and recovering a catalyst comprising from about 0.05 to 2% by weight of platinum on alumina.

2. A method of preparing a platinum on alumina catalyst for the conversion and treatment of hydrocarbons which comprises the steps of combining a solution of a minor proportion of a platinum salt in an organic acid having a peptizing action on hydrous alumina with an alcoholic solution of a relatively large proportion of an aluminum alcoholate, said organic acid being present in an amount of from 2 to 60 weight per cent based on the alumina equivalent present; contacting the resulting solution with controlled small amounts of moisture to hydrolyze the aluminum alcoholate to alumina monohydrate, whereby the alumina is gelled and the platinum compound simultaneously coprecipitated therewith; drying the deposit thus obtained to obtain a hydrous alumina having a finely divided platinum deposit colloidally dispersed therethrough and substantially free of the alcoholic solvent and uncombined water; reducing said deposit to metallic platinum and recovering a catalyst of platinum based on alumina.

3. The method according to claim 2 in which the solution of platinum salt and aluminum alcoholate is treated with a small amount of an inorganic sulfide, thereby converting said salt into a colloidal sol of very finely divided platinum sulfide homogeneously dispersed throughout the solution, which is then hydrolyzed to precipitate the hydrous alumina and coprecipitate said platinum sulfide sol.

4. The process of claim 2 in which the organic acid is glacial acetic acid.

5. The process of claim 2 in which said aluminum alcoholate and the alcohol in which it is dissolved are selected from the group consisting of $C_4$ and $C_5$ alcohols and their aluminum alcoholate derivatives.

6. The process of claim 2 in which said deposit is dried by being placed in a rapid stream of stripping gas at room temperature, after which the platinum compound present is reduced to metallic platinum by heating gradually to a temperature from about 900° F. to 1000° F. in a stream of hydrogen.

7. The process of claim 2 in which the drying step is conducted at a temperature of about 100°–300° F.

8. The process of claim 2 in which the hydrolysis is carried out by treating with air which has a moisture content of about 0.5 to 5% water by volume for sixteen hours.

9. The process of claim 8 in which the aluminum alcoholate is aluminum amylate and the platinum salt is chloroplatinic acid.

10. The method of claim 2 wherein said platinum salt is selected from the group consisting of platinum chlorides, oxychlorides, nitrates, and sulfates.

11. The method of claim 2 wherein the amount of water present in the alcoholate solution of platinum salt, organic acid, and aluminum alcoholate is below 10% based on alumina.

References Cited in the file of this patent

UNITED STATES PATENTS

| | | |
|---|---|---|
| 2,340,935 | Connolly | Feb. 8, 1944 |
| 2,394,796 | Marisic | Feb. 12, 1946 |
| 2,419,272 | Marisic | Apr. 22, 1947 |
| 2,478,916 | Haensel et al. | Aug. 16, 1949 |
| 2,582,254 | Hunter | Jan. 15, 1952 |
| 2,606,159 | Owen | Aug. 5, 1952 |
| 2,611,749 | Haensel | Sept. 23, 1952 |